United States Patent [19]
Dillman et al.

[11] Patent Number: 5,242,984
[45] Date of Patent: Sep. 7, 1993

[54] SEQUENTIALLY POLYMERIZED STYRENE-ISOPRENE-STYRENE BLOCK COPOLYMER ADHESIVE COMPOSITION

[75] Inventors: Steven H. Dillman; Jeffrey G. Southwick, both of Houston, Tex.

[73] Assignee: Shell Oil Company, Houston, Tex.

[21] Appl. No.: 737,118

[22] Filed: Jul. 29, 1991

[51] Int. Cl.$^5$ .................... C08F 297/02; C08L 9/06; C08L 53/02

[52] U.S. Cl. .................... 525/314; 525/98; 524/270; 524/271

[58] Field of Search .................... 525/314, 98

[56] References Cited

U.S. PATENT DOCUMENTS

| | | | |
|---|---|---|---|
| 3,231,635 | 1/1966 | Holden et al. | 525/271 |
| 3,239,478 | 3/1966 | Harlan, Jr. | 525/316 |
| 4,822,653 | 4/1989 | Kauffman et al. | 525/98 |
| 4,833,193 | 5/1989 | Sieverding | 524/486 |
| 4,868,057 | 9/1989 | Himes | 428/412 |
| 5,118,762 | 6/1992 | Chin | 525/314 |

FOREIGN PATENT DOCUMENTS

| | | |
|---|---|---|
| 0330088 | 2/1989 | European Pat. Off. |
| 1213380 | 2/1988 | Japan |
| 1213380 | 8/1989 | Japan |

OTHER PUBLICATIONS

Promotional Material published by Kuraray Company, Ltd., Dec. 5, 1988.

New Styrene Block Copolymers for Tape and Label Use, by F. Jagisch and J. Tancrede, presented at PSTC Tech. Sem. Proceedings, May 1990.

*Primary Examiner*—James J. Seidleck
*Assistant Examiner*—M. L. Warzel
*Attorney, Agent, or Firm*—Donald F. Haas

[57] ABSTRACT

A predominantly linear sequentially polymerized styrene-isoprene-styrene block copolymer composition having a styrene content of from about 17% to about 25% and a diblock content of less than 4% of linear polymeric blocks for use in adhesives.

4 Claims, No Drawings

SEQUENTIALLY POLYMERIZED STYRENE-ISOPRENE-STYRENE BLOCK COPOLYMER ADHESIVE COMPOSITION

BACKGROUND OF THE INVENTION

This invention relates to a novel block copolymer composition for use in hot melt adhesives. More particularly, it relates to predominantly linear high triblock content styrene-isoprene-styrene block copolymer compositions comprised of linear polymeric blocks and adhesives made using such compositions.

It is known that a block copolymer can be obtained by an anionic copolymerization of a conjugated diene compound and an alkenyl arene compound by using an organic alkali metal initiator. Block copolymers have been produced which comprise primarily those having a general structure A—B and A—B—A wherein the polymer blocks A comprise thermoplastic polymer blocks of alkenyl arenes such as polystyrene, while block B is a polymer block of a conjugated diene such as polyisoprene. The proportion of the thermoplastic blocks to the elastomeric polymer block and the relative molecular weights of each of these blocks is balanced to obtain a rubber having unique performance characteristics. When the content of the alkenyl arene is small, the produced block copolymer is a so-called thermoplastic rubber. In such a rubber, the blocks A are thermodynamically incompatible with the blocks B resulting in a rubber consisting of two phases—a continuous elastomeric phase (blocks B) and a basically discontinuous hard, glass-like plastic phase (blocks A) called domains. Since the A—B—A block copolymers have two A blocks separated by a B block, domain formation results in effectively locking the B blocks and their inherent entanglements in place by the A blocks and forming a network structure.

These domains act as physical crosslinks anchoring the ends of many block copolymer chains. Such a phenomena allows A—B—A rubber to behave like a conventionally vulcanized rubber in the unvulcanized state and is applicable for various uses. For example, these network forming polymers are applicable for uses such as in adhesive formulations; as moldings of shoe soles, etc; impact modifier for polystyrene resins and engineering thermoplastics; modification of asphalt; etc.

In the prior art, such as that exemplified by U.S. Pat. Nos. 3,595,941 and 3,468,972, the disclosures of which are herein incorporated by reference, the effort was always made to select the particular coupling agent or reaction conditions that resulted in the highest coupling efficiency. High coupling efficiency is desired herein in order to produce strong adhesive compositions. However, almost all commercial polymers are substantially less than 100% coupled, i.e. they contain a substantial amount of diblock, typically 5 to 20%. Coupling efficiency is defined as the mass of molecules of coupled polymer divided by the mass of molecules of coupled polymer plus the mass of molecules of uncoupled polymer. Thus, when producing an SIS linear polymer, the coupling efficiency is shown by the following relationship:

$$\frac{\text{Mass of Molecules of } SIS}{\text{Mass of molecules of } SIS \text{ plus } SI}$$

Coupling efficiency can be determined theoretically from the stoichiometric quantity of coupling agent required for complete coupling or coupling efficiency can be determined by an analytical method such as gel permeation chromotography. Typical prior art coupling efficiency is from about 80% to almost 100%. In U.S. Pat. No. 4,096,203, coupling efficiency is controlled from about 20% to about 80%, preferably about 30% to about 70%. Prior art also disclosed how to blend polymers from processes of differing coupling efficiency. For example, if a 60% efficiency is desired, then polymers from processes having an 80% efficiency and a 40% efficiency may be blended together.

SUMMARY OF THE INVENTION

The present invention relates to predominantly linear high triblock content sequentially polymerized Styrene-Isoprene-Styrene (S-I-S) block copolymer compositions comprised of linear polymeric blocks, Preferably, the block copolymer compositions comprise less than 4 percent diblock and have styrene contents from about 17 to about 25 percent. These compositions can be used in adhesives and many other end uses.

DETAILED DESCRIPTION OF THE INVENTION

As is well known, polymers containing both aromatic and ethylenic unsaturation can be prepared by copolymerizing one or more polyolefins, particularly a diolefin, in this case isoprene, with one or more alkenyl aromatic hydrocarbon monomers, in this case styrene. The copolymers may, of course, be random, tapered, block or a combination of these, in this case block. The blocks in the copolymers of this invention are linear.

Polymers containing ethylenic unsaturation or both aromatic and ethylenic unsaturation may be prepared using free-radical, cationic and anionic initiators or polymerization catalysts. Such polymers may be prepared using bulk, solution or emulsion techniques. In any case, the polymer containing at least ethylenic unsaturation will, generally, be recovered as a solid such as a crumb, a powder, a pellet or the like. Polymers containing ethylenic unsaturation and polymers containing both aromatic and ethylenic unsaturation are, of course, available commercially from several suppliers.

Polymers of conjugated diolefins and copolymers of one or more conjugated diolefins and one or more alkenyl aromatic hydrocarbon monomers such as predominantly linear S-I-S block copolymers are frequently prepared in solution using anionic polymerization techniques, In general, when solution anionic techniques are used, these S-I-S block copolymers are prepared by contacting the monomers to be polymerized simultaneously or sequentially with an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

RLi$_n$

Wherein:

R is an aliphatic, cycloalipahtic, aromatic or alkyl-substituted aromatic hydrocarbon radical having from 1 to about 20 carbon atoms; and n is an integer of 1 to 4.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, tetrahydrofuran and the like.

The concentration of the initiator can be regulated to control the molecular weight of the overall composition and of the polystyrene blocks. Generally, the initiator concentration is in the range of about 0.25 to about 50 millimoles per 100 grams of monomer. The ratio of the initiator to the monomer determines the block size, i.e. the higher the ratio of initiator to monomer the smaller the molecular weight of the block.

Methods of controlling the molecular weights of the blocks and the overall polymer are quite well known. For instance, such are disclosed in U.S. Pat. Nos. 3,149,182, which states that the amount of monomer can be kept constant and different molecular weights can be achieved by changing the amount of catalyst of the amount of catalyst can be kept constant and different molecular weights can be achieved by varying the amount of the monomer, and in U.S. Pat. No. 3,231,635, the disclosures of which are herein incorporated by reference, and many others. A typical block copolymer composition within the scope of the present invention, having a polystyrene block molecular weight of around 11,100, a polystyrene content of 18% and an overall GPC molecular weight of about 168,000 is prepared by sequentially introducing styrene, isoprene, and styrene into the reactor, with sec-butyl lithium as initiator. As inert solvent is sued. First, styrene is polymerized at a monomer to initiator molar ratio of 120 to 1 and the isoprene polymerized at a monomer to initiator molar ratio of 1,500 to 1 and finally styrene again under the same conditions as before. The temperature may range from about $-60°$ F. to about 300° F. but preferable is in the range of about 140° F. to about 180° F. to balance rate of reaction with the possibility of thermal termination. This process offers the advantage of leaving no measurable residual diblock.

Following the sequential polymerization, the product is terminated such as by the addition of a protic terminating agent, e.g. water, alcohol or other reagents or with hydrogen, for the purpose of removing the lithium radical forming the nucleus for the condensed polymer product. The product is then recovered such as by coagulation utilizing hot water or steam or both. The polymers are not hydrogenated.

It is essential to the performance of the present invention that the S-I-S block copolymers used herein contain more than 96% triblock i.e. they must contain very little diblock, preferably less than 2%. We have found that using a high triblock content SIS block copolymer allows one to achieve greater holding power to steel than when polymers with a substantial amount of diblock are used in an adhesive formulation or when low diblock content polymers made by another process are used.

The styrene content of the block copolymers used herein should be between about 17% and about 25%. A lower styrene content would produce a polymer that would not have improved holding power. A styrene content in excess of about 25% would likely result in relatively poor tack and thus be unacceptable for use in an adhesive.

It is necessary to add an adhesion promoting or tackifying resin that is compatible with the elastomeric isoprene block. A common tackifying resin is a diene-olefin copolymer of piperylene and 2-methyl-2-butene having a softening point of about 95° C. This resin is available commercially under the tradename Wingtack 95 and is prepared by the cationic polymerization of 60% piperylene, 10% isoprene, 5% cyclopentadiene, 15% 2-methyl-2-butene and about 10% dimer, as taught in U.S. Pat. No. 3,577,398 incorporated by reference. Other tackifying resins of the same general type may be employed in which the resinous copolymer comprises 20-80 weight percent of piperylene and 80-20 weight percent of 2-methyl-2-butene. The resins normally have softening points (ring and ball) between about 80° C. and about 115° C.

Other adhesion promoting resins which are also useful in the compositions of this invention include hydrogenated rosins, esters of rosins, polyterpenes, terpene-phenol resins and polymerized mixed olefins. To obtain good thermo-oxidative and color stability, it is preferred that the tackifying resin be a saturated resin, e.g., a hydrogenated dicylopentadiene resin such as Escorez ® 5000 series resin made by Exxon or a hydrogenated polystyrene or polyalphamethylstyrene resin such as Regalrez ® resin made by Hercules.

The amount of adhesion promoting resin employed varied from about 20 to about 400 parts by weight per hundred parts rubber (phr), preferably between about 100 to about 300 phr.

The selection of the particular tackifying agent is, in large part, dependent upon the specific block copolymer employed in the respective adhesive composition. In the manufacture of disposable articles such as diapers, sanitary napkins and bed pads, there is the additional consideration of having a substantially white or clear adhesive composition.

The adhesive composition of the instant invention may contain plasticizers, such as rubber extending plasticizers, or compounding oils or liquid resins. Rubber compounding oils are well-known in the art and include both high saturates content oils and high aromatics content oils. Preferred plasticizers are low aromatic content oils, e.g. Tufflo ® 6056 oil made by Arco and Shellflex ® 371 oil made by Shell. The amounts of rubber compounding oil employed in the invention composition can vary from about 0 to about 100 phr, and preferably between about 0 to about 60 phr.

Optional components of the present invention are stabilizers which inhibit or retard heat degradation, oxidation, skin formation and color formation. Stabilizers are typically added to the commercially available compounds in order to protect the polymers against heat degradation and oxidation during the preparation, use and high temperature storage of the adhesive composition.

Additional stabilizers known in the art may also be incorporated into the adhesive composition. These may be for protection during the life of the disposable article against, for example, oxygen, ozone and ultraviolet radiation. However, these additional stabilizers should be compatible with the essential stabilizers mentioned herein-above and their intended function as taught herein.

The adhesive compositions of the present invention are typically prepared by blending the components at an elevated temperature, preferably between about 130° C. and about 200° C., until a homogeneous blend is obtained, usually less than three (3) hours. Various methods of blending are known to the art and any method that produces a homogeneous blend is satisfactory.

The resultant adhesives may then preferably be used in a wide variety of pressure sensitive and product assembly applications. Examples include tapes, labels, diapers, sanitary napkins and decals.

In the following examples, the percent triblock was determined by Gel Permeation Chromatography. The RVTD viscosity was measured in centipoise (cps) by ASTM D-3236 using a Brookfield RVTD Thermocell viscometer with a number 29 spindle. The SAFT was measured by 1"×1"Mylar to Mylar lap joint with a 1 kg weight. SAFT measures the temperature at which the lap shear assembly fails under load. The molecular weights were determined by gel permeation chromatography as styrene equivalent molecular weight. The polystyrene content was determined by nuclear magnetic resonance spectroscopy. Rolling Ball Tack is the distance a steel ball rolls on the adhesive film with a standard initial velocity (PSTC test no. 6). Small numbers indicate aggressive tack. Holding Power is the time required to pull a standard area (½ in. ×½ in.) of tape from a standard test surface (steel, Kraft paper) under a standard load (2 kg), in shear at 2° antipeel (Pressure Sensitive Tape Council Method No. 7). 180 degree peel was determined by Pressure Sensitive Tape Council Method no. 1. Polyken probe tack was determined by ASTM D-2979. Loop tack was determined using TLMI loop tack tester.

EXAMPLES

A number of polymer samples were used to make adhesive formulations and tested for performance. In each case, the adhesvie formulation comprised 100 parts of the polymer of interest, 125 parts of ESCOREZ® 1310 hydrocarbon resin and 20 parts of SHELL-FLEX® 371 oil. The composition was dissolved in sufficient toluene to form a 40% solids by weight solution. The solution was then drawn over a 1 mil thick polyester film and dried to form a 1.5 mil adhesive layer. Drying was accomplished by evaporating the solvent in a hood for 1 hour followed by 4 hours in a vacuum oven at 104° F. The samples were then placed in a room at 74° F. and 50% relative humidity for 16 hours prior to testing. Testing was performed according to the procedure as set forth above.

The polymers used herein are described in Table 1 below. Polymer A was produced by the well-known coupling process such as described in U.S. Pat. No. 4,096,203 which is herein incorporated by reference. An alkyllithium compound was reacted with styrene in an inert solvent. When the reaction has essentially reached completion, isoprene was introduced and allowed to react to form a diblock polymer. Finally, a difunctional coupling agent was introduced resulting in a linear triblock polymer structure. This process allows control of coupling efficiency but it suffers from the disadvantage that typically from 5 to 20% of uncoupled diblock remains in the polymer. Polymer A contained only about 82% triblock. It is believed that Polymer B was made by a process known as difunctional initiation. This involves the use of a difunctional organolithium compound as an initiator. The difunctional organolithium is reacted with an isoprene monomer to form a polyisoprene with two living ends, Li-I-Li. Styrene is then introduced to form Li-SIS-Li. Finally, the polymer is terminated with a protic terminating agent. This process apparently produces a polymer with no significant amount of diblock. However, it is likely somewhat more difficult to control than the sequential process used herein.

The other polymer samples listed in Table 1 were made by the sequential polymerization process of the present invention. In this process, half of the total styrene to be included in the polymer is reacted with an alkyllithium (sec-butyl lithium) compound in an inert solvent (cyclohexane) to form polystyryllithium. The product is then reacted with isoprene to form a living diblock polymer having the structure SI-Li. At this point, the remaining styrene is added to the product to form a living triblock of the form SIS-Li. Finally, the polymer is terminated with a protic terminating agent (methanol). The polymerization reactions were performed at 120° F. to 200° F. There was no measurable diblock content in any of the four polymers made by this process but, for reasons discussed below, there may have been some diblock in RP6407-89. It is not possible to get a quantitative measure of how much diblock is present in that polymer since current GPC technology is incapable of resolving it from the triblock at such low levels.

TABLE 1

| Polymer | Molecular Weight | PSC (%) | Triblock Content by GPC (%) |
|---|---|---|---|
| Polymer A | 218,000 | 14.8 | 82 |
| Polymer B | 181,000 | 17.9 | 100 |
| PP3811 | 168,000 | 17.8 | 100 |
| RP6407-87 | 177,000 | 16.8 | 100 |
| RP6407-89 | 186,000 | 17.0 | 100 |
| RP6407-1020 | 167,000 | 18.3 | 100 |

Table 2 shows data comparing PP3811 with Polymers A and B. The critical differences are in holding power. PP3811 provides twice the holding power to steel of Polymer B and over four times the holding power to steel of Polymer A. The other properties are roughly equivalent for the three polymers.

TABLE 2

|  | A | B | PP3811 |
|---|---|---|---|
| Rolling Ball Tack (cm) | 0.6 | 0.8 | 0.8 |
| Polyken Probe Tack (kg) | 1.2 | 1.1 | 1.0 |
| Loop Tack (oz/in) | 134 | 130 | 117 |
| 180° Peel (pli) | 6.2 | 6.0 | 4.6 |
| Holding Power/Kraft (min) | 330 | 220 | 740 |
| Holding Power/Steel (min) | 260 | 530 | 1150 |
| SAFT Kraft (°C.) | 56 | 47 | 53 |
| SAFT Mylar (°C.) | 89 | 90 | 91 |

Table 3 shows data for five polymers, the three mentioned above, RP6407-89 and PP3811 with 4% of a styrene-isoprene diblock added to it. All three of the polymers made according to the present invention, PP3811, PP3811 plus 4% diblock and RP6407-89, have higher holding power to steel than Polymers A and B. Even so, it can be seen that adding 4% diblock to PP3811 drastically decreases its holding power to steel. The holding power to steel of RP6407-89 is much lower than that of PP3811, probably due to the lower styrene content and a higher level of dieout at the interface between the rubber block and the second styrene block which produces a high molecular weight diblock. As stated above, this cannot be measured.

TABLE 3

|  | PP3811 | PP3811 +4% Db | B | RP6407 −89 | A |
|---|---|---|---|---|---|
| Rolling Ball Tack (cm) | 3.6 |  | 11.0 |  | 2.0 |
| Polyken Probe Tack (kg) | 1.1 |  | 0.7 |  | 1.1 |
| Loop Tack (oz/in) | 97 |  | 87 |  | 102 |
| 180° Peel (pli) | 4.8 |  | 3.6 |  | 5.3 |
| Holding Power/Kraft (min) | 310 | 260 | 630 | 480 | 220 |
| Holding Power/Steel (min) | 1310 | 580 | 540 | 740 | 290 |
| SAFT Kraft (°C.) | 62 |  | 58 |  | 65 |
| SAFT Mylar (°C.) | 93 |  | 92 |  | 89 |

Table 4 compares Polymer A with three polymers made by the present invention, PP3811, RP6407-87 and RP6407-89. Again, it can be seen that the holding power to steel of all three of the invention samples is higher than that of Polymer A. The holding power of RP6407-87 is much lower than the other two. It is believed that this is due to the lower styrene content of RP6407-87.

TABLE 4

|  | PP3811 | RP6407 −87 | RP6407 −89 | A |
|---|---|---|---|---|
| Rolling Ball Tack (cm) | 1.6 | 1.2 | 2.4 | 1.0 |
| Polyken Probe Tack (kg) | 0.9 | 1.1 | 1.5 | 1.5 |
| Loop Tack (oz/in) | 100 | 111 | 112 | 117 |
| 180° Peel (pli) | 5.5 | 5.7 | 5.4 | 5.3 |
| Holding Power/Kraft (min) | 390 | 300 | 260 | 240 |
| Holding Power/Steel (min) | 2560 | 370 | 720 | 340 |
| SAFT Kraft (°C.) | 58 | 63 | 61 | 55 |
| SAFT Mylar (°C.) | 93 | 90 | 90 | 92 |

Table 5 compares PP3811, RP6407-87, RP6407-1020 and Polymer A. RP6407-1020 is seen to provide holding power to steel equal to that of PP3811. The remaining properties are roughly equal to those of Polymer A.

TABLE 5

|  | PP3811 | RP6407 −87 | RP6407 1020 | A |
|---|---|---|---|---|
| Rolling Ball Tack (cm) |  |  | 0.9 | 0.7 |
| Polyken Probe Tack (kg) |  |  | 1.4 | 1.4 |
| Loop Tack (oz/in) |  |  | 66 | 74 |
| 180° Peel (pli) |  |  | 6.5 | 7.0 |
| Holding Power/Kraft (min) | 520 | 530 | 530 | 200 |
| Holding Power/Steel (min) | 1010 | 480 | 1140 | 230 |
| SAFT Kraft (°C.) |  |  | 50 | 53 |
| SAFT Mylar (°C.) |  |  | 93 | 90 |

We claim:

1. A linear sequentially polymerized styrene-isoprene-styrene block copolymer which, when incorporated into an adhesive formulation produces higher holding power to steel than coupled and difunctional initiated styrene-isoprene-styrene block copolymers, and which has a styrene content of from about 17% to about 20% and a diblock content of less than 4%.

2. An adhesive comprising the block copolymer of claim 1 and from 20 to 400 parts by weight per 100 parts styrene-isoprene-styrene block copolymer of a tackifying resin which is compatible with the isoprene block.

3. The copolymer of claim 1 wherein the diblock content is less than 2%.

4. An adhesive comprising the block copolymer of claim 3 and from 20 to 400 parts by weight per 100 parts styrene-isoprene-styrene block copolymer of a tackifying resin which is compatible with the isoprene block.

* * * * *